United States Patent [19]

Yu

[11] Patent Number: 5,713,739

[45] Date of Patent: Feb. 3, 1998

[54] LEARNING AID FOR USE IN LANGUAGE EDUCATION

[76] Inventor: Jyu-Fang Yu, 3355-B Lake Austin Blvd., Austin, Tex. 78703

[21] Appl. No.: 764,042

[22] Filed: Dec. 12, 1996

[51] Int. Cl.⁶ .................................................. G09B 19/06
[52] U.S. Cl. ............................................ 434/157; 283/46
[58] Field of Search ................................... 434/157, 156, 434/167, 430; 283/46

[56] References Cited

U.S. PATENT DOCUMENTS 3,435,542  4/1969  Barouh ................................... 434/157

FOREIGN PATENT DOCUMENTS 1578649  11/1980  United Kingdom ..................... 283/46

*Primary Examiner*—Jeffrey A. Smith
*Attorney, Agent, or Firm*—Stanford & Bennett, L.L.P.; Bruce E. Garlick

[57] ABSTRACT

A learning aid (100) is employed in learning a target language based upon a known language. The learning aid (100) includes a foldable structure (102) and a plurality of inserts (114, 116, 118). The foldable structure (102) may be placed in any of a plurality of predetermined foldable states and includes a plurality of receiving locations (108, 110, 112), each of which receives one of the plurality of inserts (114, 116, 118). In a transition state, the learning aid (100) presents target language vocabulary (200), corresponding known language vocabulary (204) and corresponding transitions (202) between the known language vocabulary (204) and the target language vocabulary (200). The transitions (202) may include pronunciations of the target language vocabulary (200) such as phonetic pronunciation symbols (402). In a pronunciation state, the learning aid (100) presents only phonetic pronunciation symbols (402). In a sentence completion state, the learning aid (100) presents a partially completed target language sentence (500) and may present known language vocabulary (204). In a sentence translation state, the learning aid (100) presents a partially completed target language sentence (500) and a completed known language sentence (504). In a context translation state, the learning aid (100) presents target language vocabulary (200) and a completed known language sentence (504). In another embodiment, a learning aid (600) is formed of a single foldable structure (602) pre-folded into the plurality of panels (610, 612, 614, 616) that present the vocabulary, sentences and transitions to a student. In an additional embodiment, a learning aid (700) presents first target language vocabulary (716) and phonetics (718), second target language vocabulary (720) and phonetics (722), partially completed sentences for each (736, 740) and known language vocabulary (712) and sentence translations (732).

20 Claims, 9 Drawing Sheets

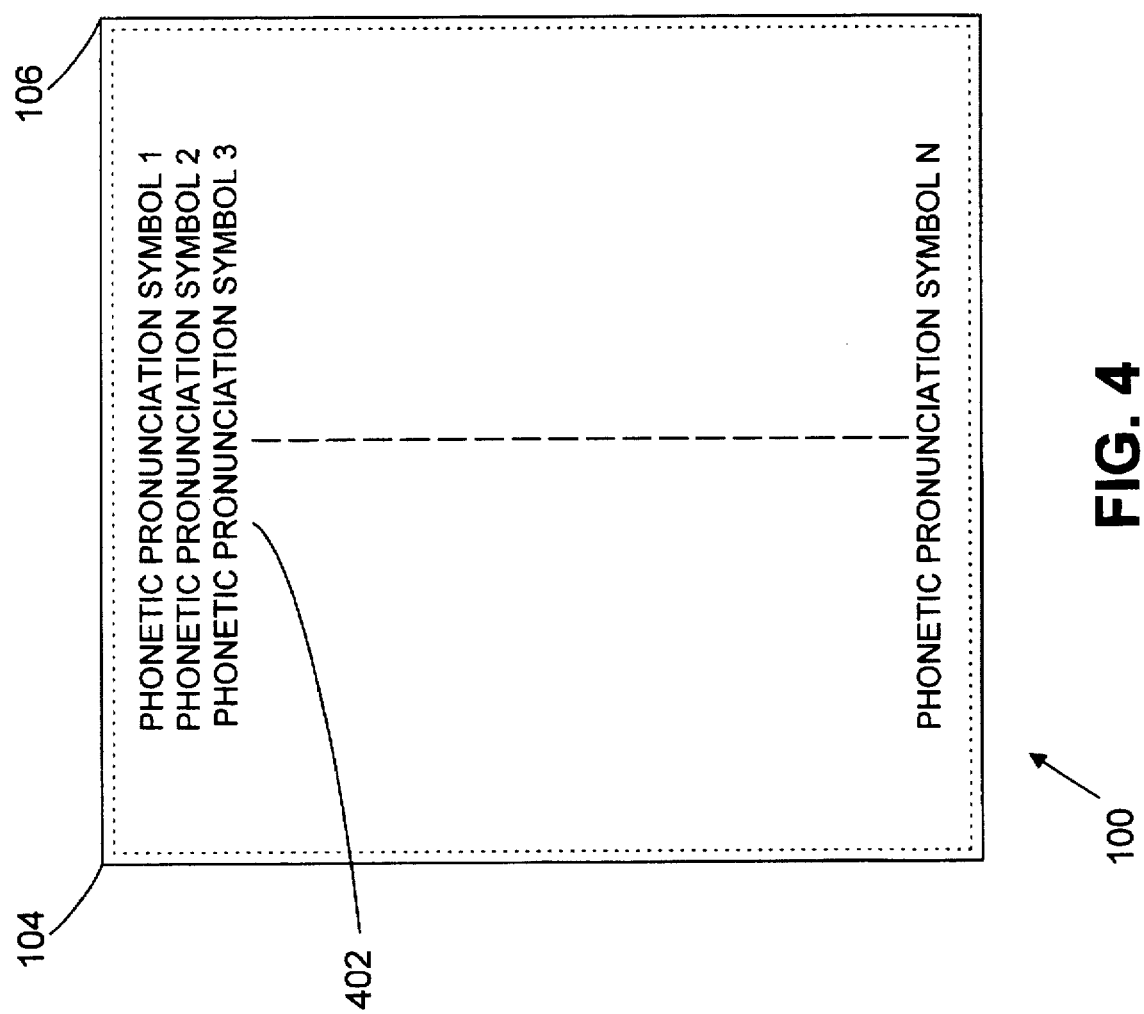

LEARNING AID FOR USE IN LANGUAGE
EDUCATION

BACKGROUND

1. Technical Field

The present invention relates generally to education, and, specifically, to a learning aid operable in a variety of positions to aid a user in learning a foreign target language. The learning aid provides a user with target language vocabulary, known language vocabulary, transitions from the target language vocabulary to the known language vocabulary and language translation exercises. The learning aid provides various lesson and exercise formats, the nature of which depends upon the particular operational state of the learning aid and the particular lesson taught.

2. Related Art

It is well known to use aids in education. Textbooks, workbooks, video recordings, audio recordings, computer programs, flash cards and other aids are commonly employed in education. While standard aids succeed in teaching many topics, they provide little assistance in foreign language education. In the study of foreign languages, a known language is provided as a reference point from which instruction in an unknown target language is provided. Textbooks typically contain lessons and exercises that allow students to learn a target language in a static, visual manner. Instructors typically assign readings and exercises contained within textbooks while basing classroom lessons on the assignments. While the assigned readings and exercises provide visual instruction, the classroom lessons provide the students with audio instruction that teaches the students pronunciation of the target language. Without the audio instruction received in the classroom, the students are generally unable to adequately converse in the target language. Thus, in themselves, visual aids such as textbooks, workbooks and flash cards provide only visual instruction without instruction in pronunciation.

Video recordings, audio recordings and computer programs each provide audio instruction in the target language. However, these aids are usually expensive to acquire as is the electronic equipment required to use these aids. Further, the electronic equipment required to use these aids is oftentimes neither available nor accessible when use of the aids is desired. Further, these aids typically do not provide sufficient correlation between the known language and the target language to allow a student to thoroughly master the target language.

Thus, there lies a need for a learning aid that provides an effective tool for learning an unknown target language based upon a known language. Further, there lies a need for such a learning aid that is low in cost, transportable and easy to use.

SUMMARY OF THE INVENTION

A learning aid according to the present invention employed in learning a target language based upon a known language includes a foldable structure and a plurality of inserts. The foldable structure may be placed in any of a plurality of predetermined foldable states and includes a plurality of receiving locations. Each of the plurality of inserts resides within one of the plurality of receiving locations.

In a transition state of the predetermined foldable states, the plurality of inserts present target language vocabulary, corresponding known language vocabulary and corresponding transitions between the known language and the target language. In one embodiment of the learning aid, a first insert illustrates target language vocabulary, a second insert illustrates known language vocabulary and a third insert illustrates the transitions between the known language and the target language. The transitions may provide pronunciations of the target language vocabulary and may include phonetic pronunciation symbols corresponding to the target language vocabulary.

In a phonetic state of the predetermined foldable states, the plurality of inserts present both target language vocabulary and corresponding phonetic pronunciation symbols. In a pronunciation state of the predetermined foldable states, the plurality of inserts present only the phonetic pronunciation symbols corresponding to the target language vocabulary. In a sentence completion state of the predetermined foldable states, the plurality of inserts present a partially completed target language sentence and may also present known language vocabulary. In a sentence translation state of the predetermined foldable states, the plurality of inserts present a partially completed target language sentence and a completed known language sentence. Finally, in a context translation state of the predetermined foldable states, the plurality of inserts present target language vocabulary and a completed known language sentence.

In another embodiment of the present invention, the learning aid is formed of a single foldable structure prefolded into a plurality of panels so that the learning aid may be placed into any of the foldable states. In the embodiment, the panels of the learning aid present the vocabulary, sentences and transitions to a student instead of the inserts previously described.

By providing the target language vocabulary, known language vocabulary and translations in a simple-to-use visual format, the learning aid provides a low cost and effective language education aid. By providing pronunciations of the target language vocabulary in a standard format, the learning aid provides pronunciation instruction without requiring external equipment or an instructor. Further, by providing a learning aid that may be placed in different foldable states, each of which corresponds to a particular lesson, the learning aid provides multiple lessons with a single structure at a low cost. The learning aid may be easily transported so that it can be used in many different environments in which prior learning aids could not be used.

Moreover, other aspects of the present invention will become apparent with further reference to the drawings and specification which follow.

BRIEF DESCRIPTION OF THE DRAWINGS

FIG. 4 is a diagram illustrating the learning aid of FIG. 1 disposed in a pronunciation state in which the learning aid presents only phonetic pronunciation symbols corresponding to the target language vocabulary;

DETAILED DESCRIPTION

Figure 1:
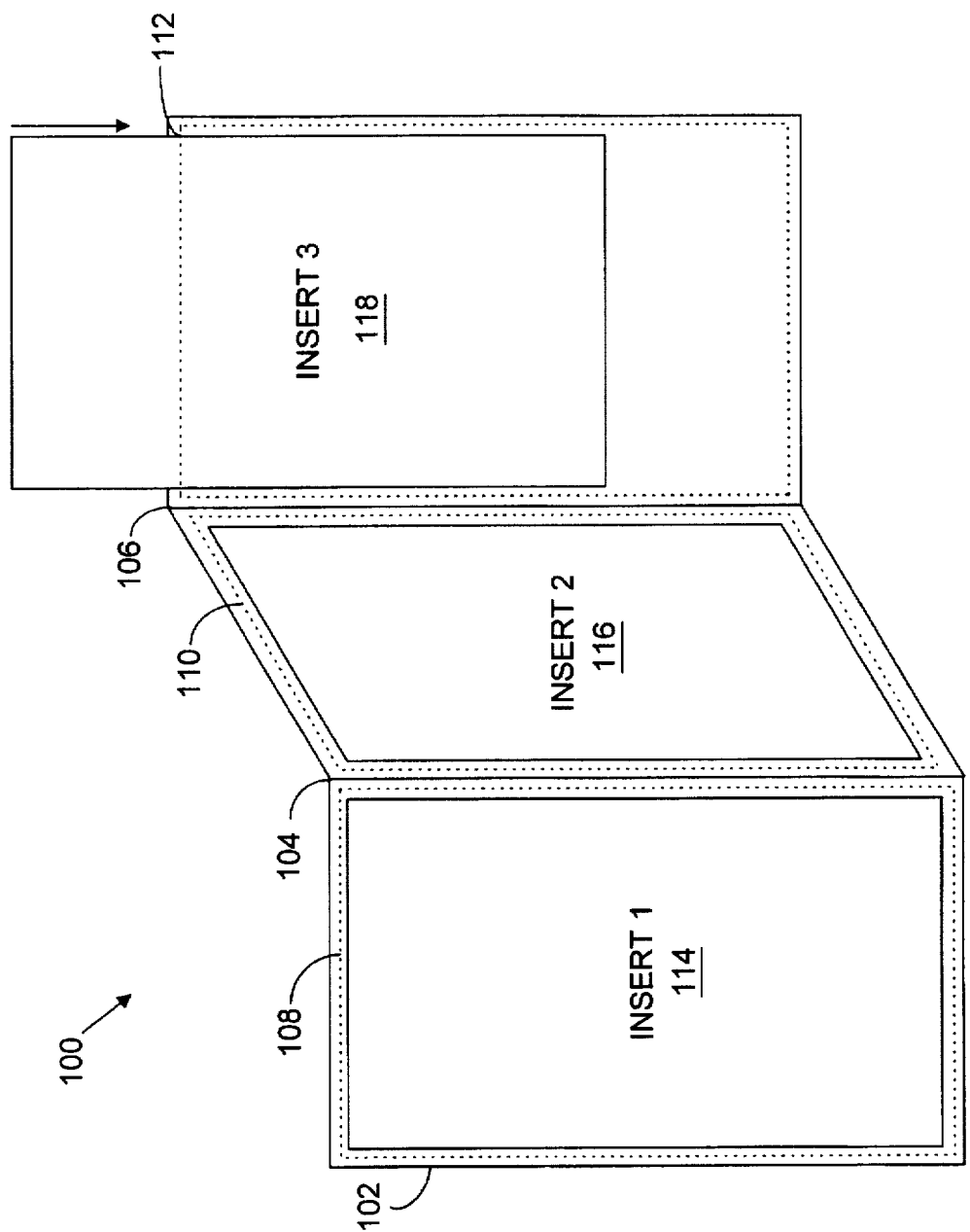
FIG. 1 is a diagrammatic perspective view illustrating a learning aid according to the present invention, the learning aid including a foldable structure that receives a plurality of inserts and that may be placed into any of a plurality of predetermined foldable states.

FIG. 1 illustrates a learning aid 100 according to the present invention that may be employed by a student in learning a target language based upon a known language. For example, the learning aid 100 may be used by a student in learning the English language based upon knowledge of the Chinese language. The learning aid 100 visually provides target language vocabulary, corresponding known language vocabulary and transitions between the target language vocabulary and corresponding known language vocabulary. The transitions may include pronunciations of the target language vocabulary that aid the user in learning correct pronunciations of the target language vocabulary. The learning aid 100 may also present sentence completion exercises to the user that aid the student in learning correct spelling and usage of the target language vocabulary.

The learning aid 100 includes a foldable structure 102 that receives a plurality of inserts 114, 116 and 118. The foldable structure 102 may be placed into any of a plurality of predetermined foldable states to present various lesson segments to the student. The foldable structure 102 folds along fold lines 104 and 106 to facilitate the predetermined foldable states. The foldable structure 102 may be constructed of plastic, vinyl or another transparent material that allows the inserts 114, 116 and 118 to be viewed through the foldable structure 102. Pockets (or receiving locations) 108, 110 and 112 receive the inserts 114, 116 and 118 so that the inserts may be easily inserted and removed. In other embodiments, the foldable structure 102 may include less than three or more than three pockets to receive a corresponding number of inserts. Further, in still other embodiments, the foldable structure 102 receives more than one insert in each pocket.

In learning a target language, many different lessons are required. Each set of inserts 114, 116 and 118 conveys a particular lesson. Thus, the foldable structure 102 facilitates different lessons by allowing different insert sets to be placed into and removed from the pockets 108, 110 and 112 as required. As illustrated, insert 118 is inserted into pocket 112 within the foldable structure 102 from above to prepare the foldable structure 102 for a particular lesson. Further, pockets 108 and 110 receive inserts 114 and 116, respectively.

Figure 2:
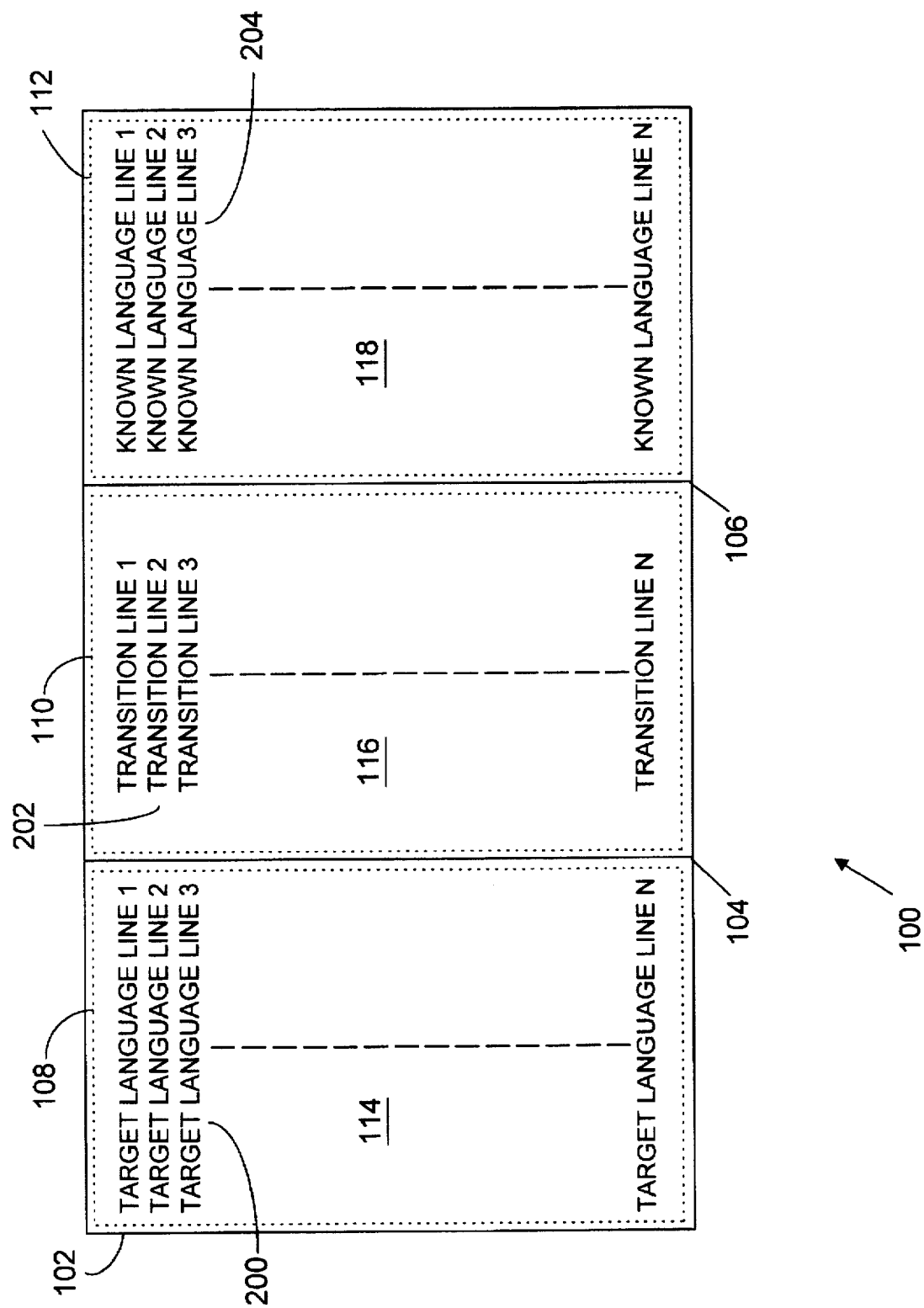
FIG. 2 is a diagram illustrating the learning aid of FIG. 1 disposed in a transition state in which the learning aid presents target language vocabulary, known language vocabulary and transitions between the target language vocabulary and the known language vocabulary.

FIG. 2 illustrates the learning aid 100 of FIG. 1 disposed in a transition state in which the learning aid presents target language vocabulary 200, known language vocabulary 204 and transitions 202 between the target language vocabulary 200 and the known language vocabulary 204. Elements described with reference to FIG. 1 will not be further described with reference to this FIG. or subsequent FIGs. except as may be required to expand upon the teachings of the present invention. The target language vocabulary 200 is printed upon a front side of insert 114 and arranged as a plurality of lines of vocabulary. For example, in teaching the English language based upon the Chinese language, the target language vocabulary 200 would include a plurality of lines of English language vocabulary words. Typical words may include six, girl, tall, short, Jane, thin, boy, etc. arranged in N lines. The known language vocabulary 204 is printed upon a front side of insert 118 and includes N lines of Chinese language vocabulary words, each of which may correspond to the English language vocabulary word on the same line or on another line. The transitions 202 are printed upon a front side of insert 116 and provide relationships between the target language vocabulary 200 and the known language vocabulary 204. Transitions 202 may include pronunciations of corresponding target language vocabulary 200 or may include other prompts that cause a user to associate the target language vocabulary 200 with corresponding known language vocabulary 204.

Figure 3:
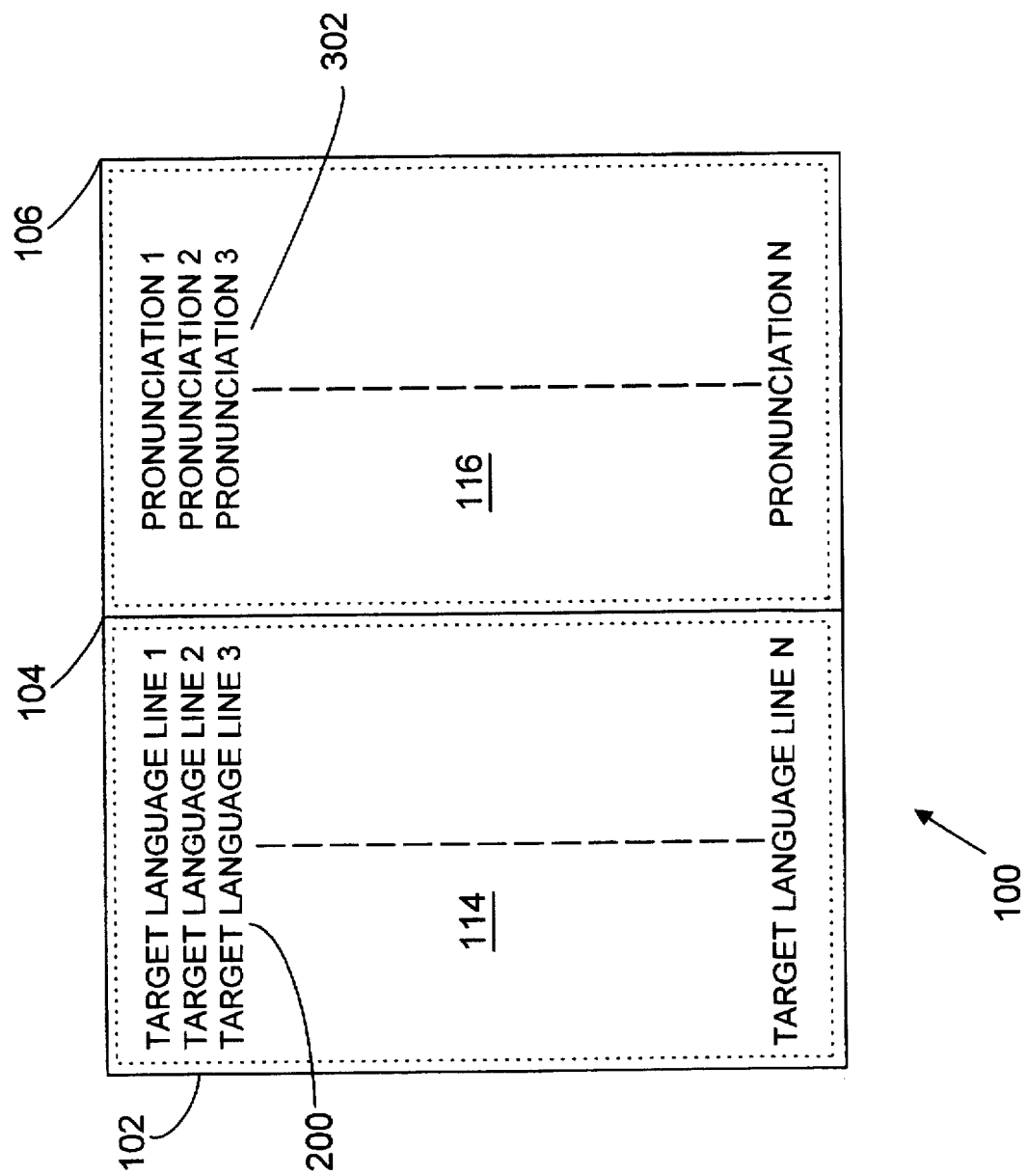
FIG. 3 is a diagram illustrating the learning aid of FIG. 1 disposed in a phonetic state in which the learning aid presents the target language vocabulary and pronunciation symbols that serve as the transitions between the target language vocabulary and the known language vocabulary.

FIG. 3 illustrates the learning aid 100 of FIG. 1 disposed in a phonetic state in which the learning aid 100 presents the target language vocabulary 200 and pronunciation symbols 302 that serve as the transitions between the target language vocabulary 200 and the known language vocabulary 204. In the phonetic state, the foldable structure 102 folds along fold line 106 but not along fold line 104 so that only the target language vocabulary 200 and the pronunciation symbols 302 are shown. Thus, in the phonetic state, the learning aid 100 removes presentation of the known language vocabulary 204 thereby reinforcing correlation between the pronunciation symbols 302 and the target language vocabulary 200. By using the learning aid 100 in the phonetic state, the student learns correct pronunciation of the target language vocabulary 200 without reference to the known language vocabulary 204.

FIG. 4 illustrates the learning aid 100 of FIG. 1 disposed in a pronunciation state in which the learning aid 100 presents only phonetic pronunciation symbols 402 corresponding to the target language vocabulary 200. In the pronunciation state, the foldable structure 102 folds along fold lines 104 and 106 so that inserts 114 and 118 reside behind insert 116. Examples of phonetic pronunciation symbols 402 include [ju] for you, [bI] for bill, [bUk] for book, [pliz] for please, [kloz] for close and [rum] for room. In the pronunciation state, the learning aid 100 reinforces recognition of the target language vocabulary 200 as well as reinforcing correct pronunciation of the target language vocabulary 200. By removing from view both the target language vocabulary 200 and the known language vocabulary 204, the learning aid 100 forces the user to make a cognitive connection between the target language vocabulary 200 and the known language vocabulary 204.

Figure 5A:
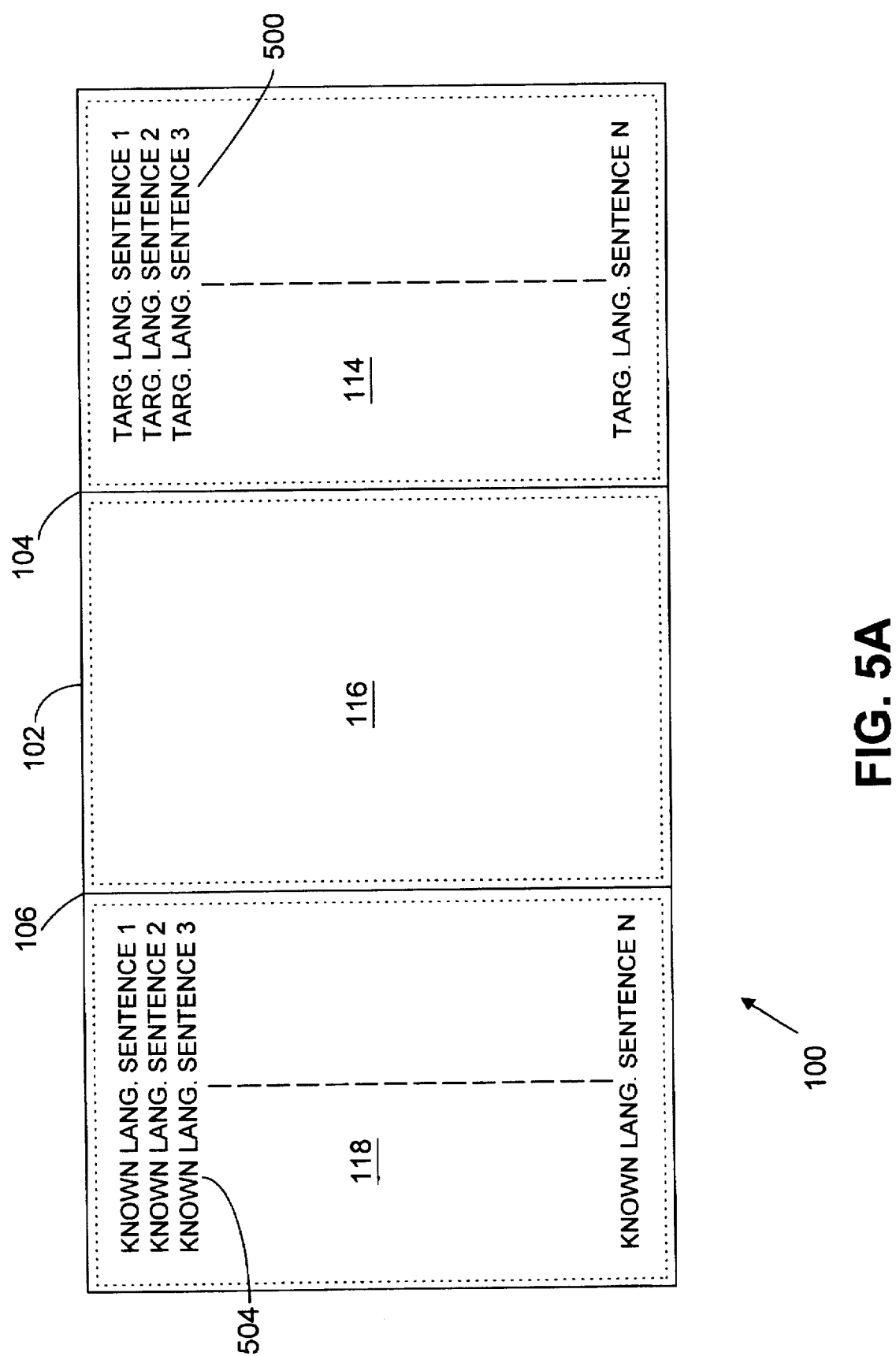
FIG. 5A is a diagram illustrating the learning aid of FIG. 1 disposed in a sentence translation state in which the learning aid presents partially completed target language sentences and corresponding completed known language sentences.

FIG. 5A illustrates the learning aid 100 of FIG. 1 disposed in a sentence translation state in which the learning aid 100 presents partially completed target language sentences 500 and corresponding completed known language sentences 504. As compared to the view of FIG. 2, the view of FIG. 5A is from the reverse side of the learning aid 100 such that reverse sides of inserts 114, 116 and 118 are in view. Thus, the partially completed target language sentences 500 reside on a back side of insert 114 while the target language vocabulary 200 resides on a front side of insert 114. Further, the corresponding completed known language sentences 504 reside on a back side of insert 118 while the known language vocabulary 204 resides on a front side of insert 118. As illustrated, the transitions 202 reside on a from side of insert 116 while a back side of insert 116 is blank. In other embodiments, the back side of insert 116 could provide transitions between the partially completed target language sentences 500 and the completed known language sentences 504.

Thus, in the sentence translation state, the learning aid 100 places target language vocabulary 200 in context so that the student may use the target language vocabulary 200 in the partially completed target language sentences 500. In the embodiment of the learning aid 100 illustrated, the N partially completed target language sentences 500 illustrated may not coincide to the N completed known language sentences 504 on a line-by-line basis. Thus, the student must perform an extra step in discovering an answer when using the completed known language sentences 504. By forcing this extra step, the learning aid 100 tends to discourage the student from relying upon the completed known language sentences 504 and instead to complete the partially completed target language sentences 500 without reference to the completed known language sentences 504.

Figure 5B:
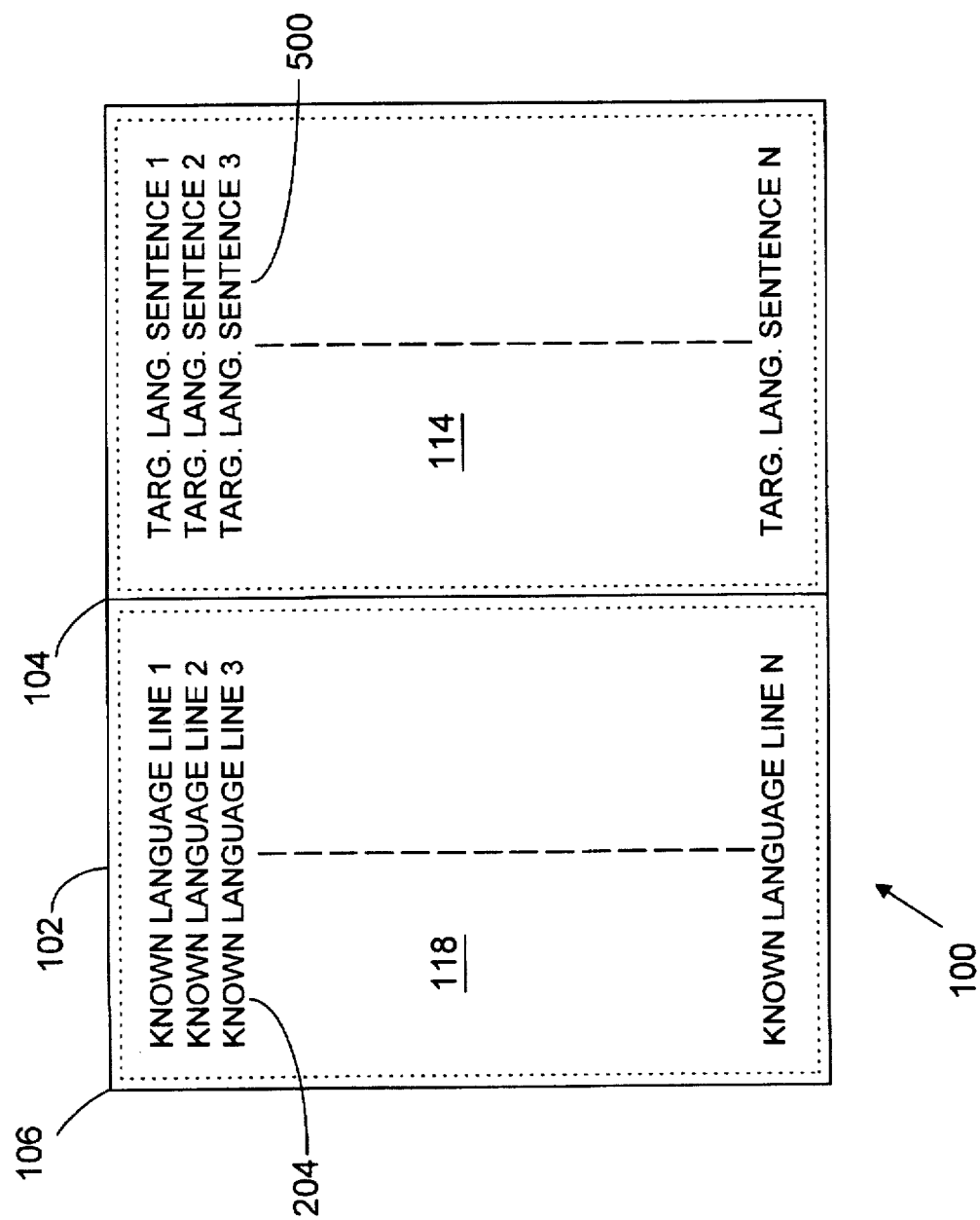
FIG. 5B is a diagram illustrating the learning aid of FIG. 1 disposed in a sentence completion state in which the learning aid presents partially completed target language sentences and corresponding known language vocabulary.

FIG. 5B is a diagram illustrating the learning aid 100 of FIG. 1 disposed in a sentence completion state in which the learning aid 100 presents the partially completed target language sentences 500 and corresponding known language vocabulary 204. To place the learning aid 100 in the sentence completion state, the foldable structure 102 folds along fold line 106 to present the front side of insert 118 and the back side of insert 114. In the sentence completion state, the learning aid 100 presents the known language vocabulary 204 but does not present the completed known language sentences 504. To complete the partially completed target language sentences 500, the student must select appropriate target language vocabulary 200 with reference to only the known language vocabulary 204. Thus, in the sentence completion state, the learning aid 100 reinforces knowledge of the target language vocabulary 200 and its correct usage in the partially completed target language sentences 500.

Figure 6:
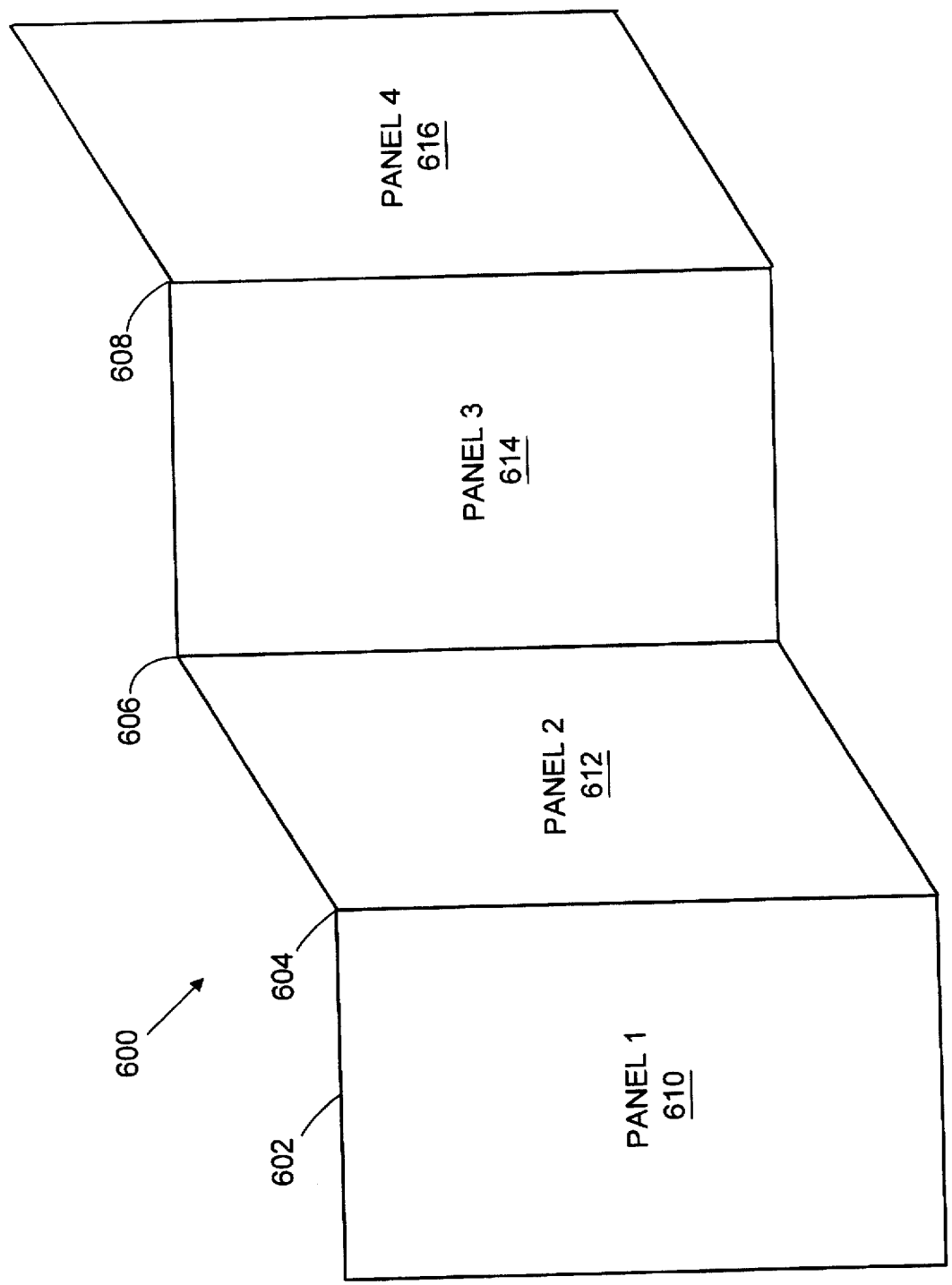
FIG. 6 is a diagram illustrating an alternative embodiment of a learning aid according to the present invention wherein the learning aid includes a plurality of panels foldable into a plurality of predetermined foldable states.

FIG. 6 is a diagram illustrating an alternative embodiment of a learning aid 600 according to the present invention wherein the learning aid 600 includes a plurality of panels 610, 612, 614 and 616 foldable into a plurality of predetermined foldable states. The teaming aid 600 folds along fold lines 604, 606 and 608 so that the learning aid 600 may be placed into any of the predetermined foldable states. The learning aid 600 may be constructed from a single sheet of paper or light-weight cardboard 602 pre-folded at fold lines 604, 606 and 608 so that the learning aid 600 may be placed into any of the plurality of predetermined foldable states. While the teaming aid 600 illustrated includes four panels 610, 612, 614 and 616, the learning aid could comprise three panels or more than four panels.

In the embodiment, the target language vocabulary 200, known language vocabulary 204, transitions 202, completed known language sentences 504 and partially completed target language sentences 500 are printed upon the plurality of panels 610, 612, 614 and 616. Thus, as compared to the learning aid 100 of FIGS. 1 through 5B, the learning aid 600 does not include a foldable structure 102 having a plurality of pockets 108, 110 and 112 for receiving inserts 114, 116 and 118. Instead, the learning aid 600 includes the plurality of panels 610, 612, 614 and 616 which present only a single lesson set. However, construction costs of the learning aid 600 are less than construction costs of the learning aid 100 of FIGS. 1 through 5B for an equivalent sized structure.

Figure 7A:
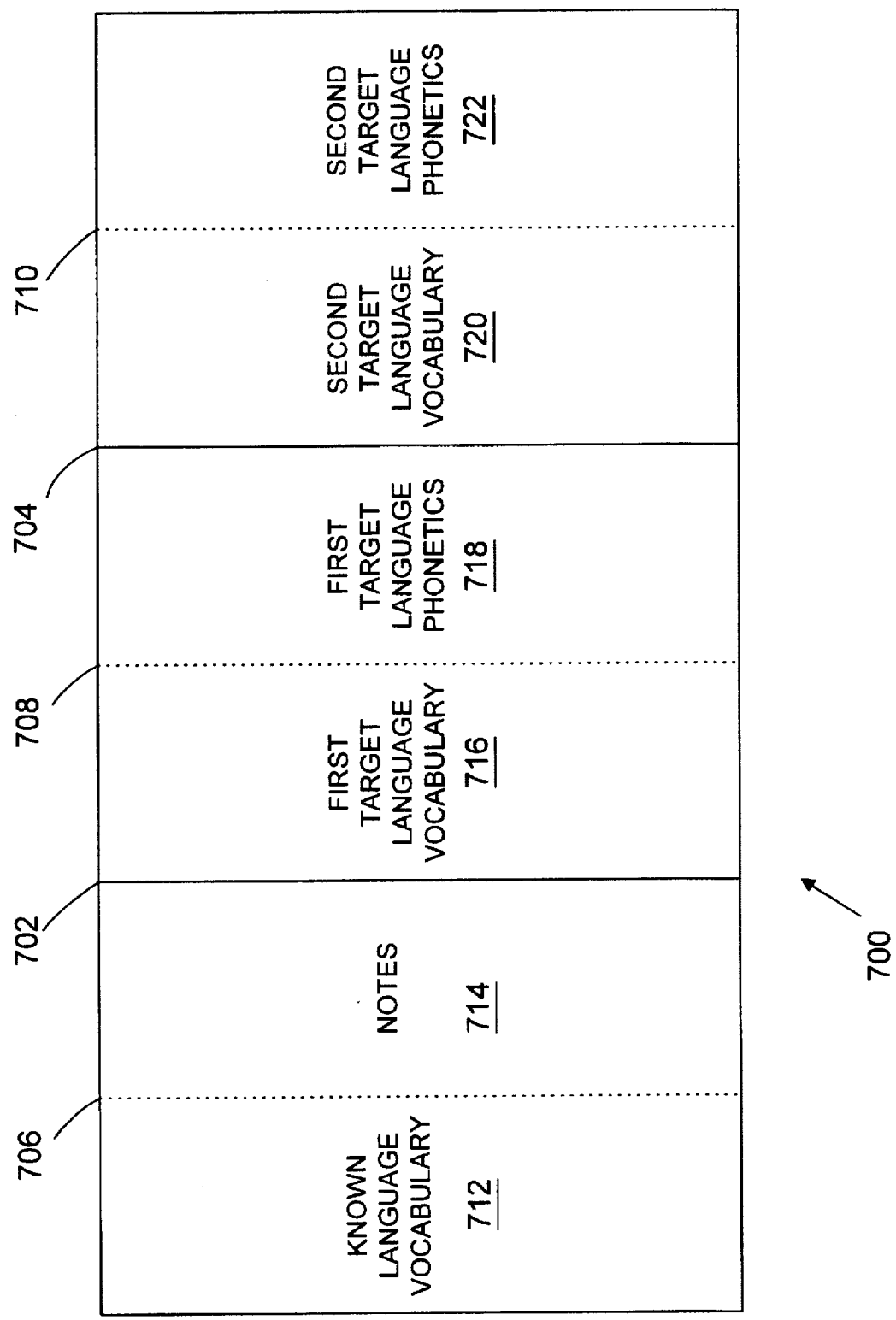
FIG. 7A is a diagram illustrating another embodiment of a learning aid according to the present invention disposed in a transition state in which the learning aid presents known language vocabulary, first target language vocabulary, first target language phonetics, second target language vocabulary and second target language phonetics.

FIG. 7A is a diagram illustrating another learning aid 700 according to the present invention disposed in a transition state in which the learning aid presents known language vocabulary 712, first target language vocabulary 716, first target language phonetics 718, second target language vocabulary 720 and second target language phonetics 722. The learning aid 700 therefore may present lessons in two target languages. While instruction in two target languages is often difficult, similarities between target languages or between the known language and one of the target languages may cause instruction to be somewhat easier. Further, when the student already knows one of the target languages, the learning aid takes advantage of the student's knowledge of both the known language and the known target language in providing instruction in the unknown target language. The teaming aid 700 also includes a notes portion 714 that provides the student with a location to make notes regarding vocabulary of interest.

The learning aid 700 folds along fold lines 702, 704, 706, 708 and 710 so that the learning aid 700 may be placed in any of the various predetermined foldable states. The learning aid 700 resides in a transition state in FIG. 7A. However, the learning aid 700 may be placed in various other of the predetermined states by folding the learning aid along one or more of the fold lines 702, 704, 706, 708 and 710. For example, to place the learning aid in a first target language transition state in which the known language vocabulary 712, the notes 714, the first target language vocabulary 716 and first target language phonetics 718 are presented, the learning aid is folded along fold line 704 to place the second target language vocabulary 720 and the second target language phonetics 722 behind the first target language phonetics 718 and the first target language vocabulary 716. To place the learning aid 700 in a second target language transition state in which the known language vocabulary 712, the notes 714, the second target language vocabulary 720 and the second target language phonetics 722 are presented, the learning aid is folded along fold lines 708 and 704 to place the first target language phonetics 718 and the second target language vocabulary 720 atop the first target language vocabulary 716. To place the learning aid 700 in a first target language phonetic state, the learning aid 700 is folded along fold lines 702 and 704 to present only the first target language vocabulary 716 and the first target language phonetics 718. To place the learning aid 700 in a second target language phonetic state, the learning aid 700 is also folded along fold lines 702 and 704, but is positioned to present only the second target language vocabulary 720 and the second target language phonetics 722.

Figure 7B:
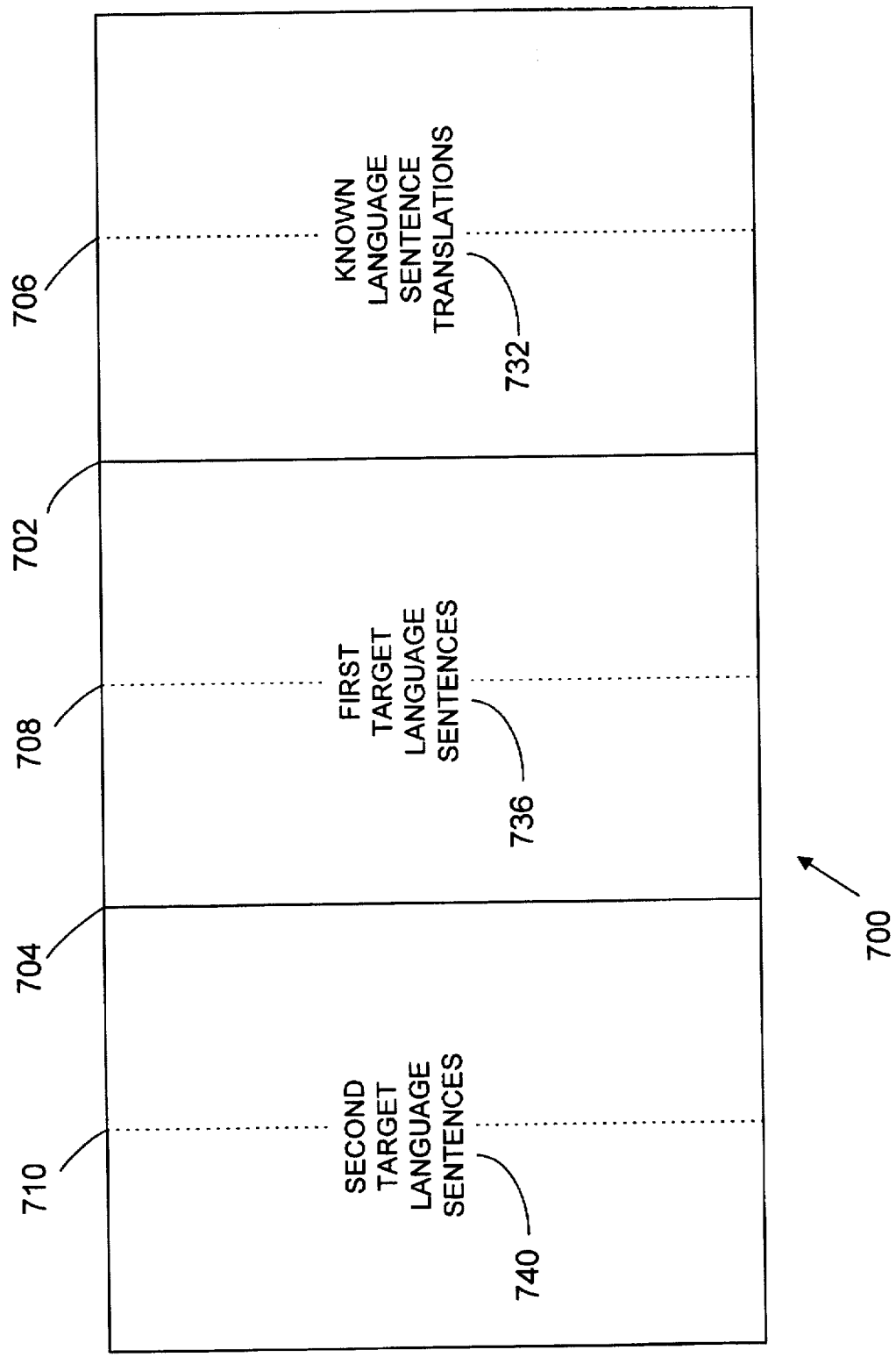
FIG. 7B is a diagram illustrating the learning aid of FIG. 7A disposed in a sentence translation state in which the learning aid presents completed known language sentences, partially completed first target language sentences and partially completed second target language sentences.

FIG. 7B is a diagram illustrating the learning aid 700 of FIG. 7A disposed in a dual sentence translation state in which the learning aid 700 presents known language sentence translations 732, partially completed first target language sentences 736 and partially completed second target language sentences 740. In FIG. 7A a from side of the learning aid 700 is shown while in FIG. 7B a back side of the learning aid 700 is shown. Thus, the known language sentence translations 732 reside on a back side of the learning aid 700 corresponding to the known language vocabulary 712 and the notes portion 714. Further, the partially completed first target language sentences 736 reside on a back side of the learning aid 700 corresponding to the first target language vocabulary 716 and the first target language phonetics 718. Finally, the partially completed second target language sentences 740 reside on a back side of the learning aid 700 corresponding to the second target language vocabulary 720 and the second target language phonetics 722.

In a first target language sentence translation state, the learning aid 700 folds along fold lines 704 and 706 to present only the first target language sentences 736 and the known language vocabulary 712. In a second target language sentence translation state, the learning aid folds along fold line 702 to present only the second target language sentences 740, the known language vocabulary 712 and the notes 714. By appropriately folding the learning aid 700, the teaming aid 700 may be placed in various other states as well.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

I claim:

1. A learning aid employed in learning a target language based upon a known language, the learning aid comprising:
   a foldable structure that may be placed in any of a plurality of predetermined foldable states, the structure having a plurality of receiving locations;
   a plurality of inserts, each of which resides within one of the plurality of receiving locations, the plurality of inserts comprising:
      a first insert that presents target language vocabulary;
      a second insert that presents known language vocabulary;
      a third insert that presents transitions between the known language and the target language; and
      a fourth insert that presents a target language sentence;
   wherein in a transition state of the predetermined foldable states, the first insert, the second insert and the third insert are viewable; and
   wherein in a sentence completion state of the predetermined foldable states, the second insert and the fourth insert are viewable.

2. The learning aid of claim 1 wherein:
   the first insert and the fourth insert comprise a unitary substrate, the target language vocabulary residing on a first side of the unitary substrate and the target language sentence residing on a second side of the unitary substrate.

3. The learning aid of claim 1 wherein the transitions comprise pronunciations of the target language vocabulary.

4. The teaming aid of claim 3 wherein the pronunciations comprise phonetic pronunciation symbols corresponding to the target language vocabulary.

5. The learning aid of claim 1, wherein in a phonetic state of the predetermined foldable states, the plurality of inserts present target language vocabulary and pronunciation symbols corresponding to the target language vocabulary.

6. The learning aid of claim 5, wherein in a pronunciation state of the predetermined foldable states, the plurality of inserts present only phonetic pronunciation symbols corresponding to the target language vocabulary.

7. The learning aid of claim 1, wherein the target language sentence is partially completed.

8. The learning aid of claim 1, further comprising a fifth insert that presents a completed known language sentence.

9. The learning aid of claim 8, wherein in a sentence translation state of the predetermined foldable states, the fourth insert and the fifth insert are viewable.

10. The learning aid of claim 9, wherein in a context translation state of the predetermined foldable states, the first insert and the fifth insert are viewable.

11. A learning aid employed in learning a target language based upon a known language, the learning aid comprising:
   a foldable structure that may be placed in any of a plurality of predetermined foldable states;
   a plurality of panels, each of which comprises a non-folded surface of the foldable structure, the plurality of panels including:
      a first panel that presents target language vocabulary;
      a second panel that presents known language vocabulary;
      a third panel that presents transitions between the known language and the target language; and
      a fourth panel that presents a target language sentence;
   wherein in a transition state of the predetermined foldable states, the first panel, the second panel and the third panel are viewable; and
   wherein in a sentence completion state of the predetermined foldable states, the second panel and the fourth panel are viewable.

12. The learning aid of claim 11 wherein:
   the first panel and the fourth panel comprise a unitary substrate, the target language vocabulary residing on a first side of the unitary substrate and the target language sentence residing on a second side of the unitary substrate.

13. The learning aid of claim 11 wherein the transitions comprise pronunciations of the target language vocabulary.

14. The learning aid of claim 13 wherein the pronunciations comprise phonetic pronunciation symbols corresponding to the target language vocabulary.

15. The teaming aid of claim 11, wherein in a phonetic state of the predetermined foldable states, the plurality of panels present target language vocabulary and phonetic pronunciation symbols corresponding to the target language vocabulary.

16. The learning aid of claim 15, wherein in a pronunciation state of the predetermined foldable states, the plurality of panels present only phonetic pronunciation symbols corresponding to the target language vocabulary.

17. The learning aid of claim 11, wherein the target language sentence is partially completed.

18. The learning aid of claim 11, further comprising a fifth panel that presents a completed known language sentence.

19. The learning aid of claim 18, wherein in a sentence translation state of the predetermined foldable states, the fourth panel and the fifth panel are viewable.

20. The learning aid of claim 19, wherein in a context translation state of the predetermined foldable states, the first panel and the fifth panel are viewable.

* * * * *